(12) United States Patent
Allen et al.

(10) Patent No.: US 10,123,182 B2
(45) Date of Patent: Nov. 6, 2018

(54) MERGING ACTIVE GROUP CALLS

(71) Applicant: BlackBerry Limited, Waterloo (CA)

(72) Inventors: Andrew Michael Allen, Hallandale Beach, FL (US); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 666 days.

(21) Appl. No.: 14/754,218

(22) Filed: Jun. 29, 2015

(65) Prior Publication Data

US 2016/0381526 A1   Dec. 29, 2016

(51) Int. Cl.
| | |
|---|---|
| *G06F 15/16* | (2006.01) |
| *H04W 4/10* | (2009.01) |
| *H04L 29/06* | (2006.01) |
| *H04W 4/08* | (2009.01) |
| *H04W 76/45* | (2018.01) |
| *H04W 4/16* | (2009.01) |

(52) U.S. Cl.
CPC .......... *H04W 4/10* (2013.01); *H04L 65/1069* (2013.01); *H04L 65/4061* (2013.01); *H04L 67/42* (2013.01); *H04W 4/08* (2013.01); *H04W 76/45* (2018.02); *H04W 4/16* (2013.01)

(58) Field of Classification Search
CPC ....... H04W 4/10; H04W 76/005; H04W 4/08; H04W 8/186; H04W 84/18; H04L 65/4061; H04L 65/1006; H04L 12/1813; H04M 2215/2093
USPC ........................................................ 709/203
See application file for complete search history.

(56) References Cited

U.S. PATENT DOCUMENTS

| | | | |
|---|---|---|---|
| 5,369,783 A | 11/1994 | Childress | |
| 7,170,863 B1 * | 1/2007 | Denman | H04W 4/10 370/260 |
| 7,643,817 B2 * | 1/2010 | Klug | H04L 63/0442 455/411 |

(Continued)

FOREIGN PATENT DOCUMENTS

| | | |
|---|---|---|
| WO | 2006/011770 | 2/2006 |
| WO | 2008/082203 | 7/2008 |
| WO | 2009/121406 | 10/2009 |

OTHER PUBLICATIONS

International Search Report and Written Opinion of the International Searching Authority issued in International Application No. PCT/US2016/039852 dated Oct. 5, 2016; 12 pages.

(Continued)

*Primary Examiner* — Melvin H Pollack
(74) *Attorney, Agent, or Firm* — Fish & Richardson P.C.

(57) ABSTRACT

A method for merging active group calls includes hosting, at a first Push to talk (PTT) server, a first active group call. A first group of PTT clients participate in the first active group call. The first PTT server receives a request to invite a second group of PTT clients. The request includes an identifier for the second group of PTT clients. The first PTT server sends a first invite message to the second PTT server. The first invite message includes the identifier for the second group of PTT clients. In response to the first invite message, the first PTT server receives a response message. The response message indicates that the second group of PTT clients are participating in the second active group call. The first PTT server hosts a merged PTT group call.

20 Claims, 10 Drawing Sheets

(56) References Cited

U.S. PATENT DOCUMENTS

| | | | |
|---|---|---|---|
| 7,693,533 B2 | 4/2010 | Sung | |
| 7,729,713 B1* | 6/2010 | Hardin | H04W 4/10 455/416 |
| 7,801,953 B1* | 9/2010 | Denman | H04W 4/10 370/260 |
| 7,933,621 B1 | 4/2011 | Vu | |
| 7,983,199 B1* | 7/2011 | Nguyen | H04L 65/4061 370/260 |
| 8,160,628 B1* | 4/2012 | Tailor | H04W 4/10 455/416 |
| 8,234,335 B1* | 7/2012 | Haldar | H04L 65/4061 709/204 |
| 9,178,773 B1* | 11/2015 | Tassone | H04M 7/0024 |
| 9,462,426 B1* | 10/2016 | Metzger | H04W 4/10 |
| 2002/0037735 A1* | 3/2002 | Maggenti | H04L 63/0428 455/517 |
| 2002/0131407 A1* | 9/2002 | Muhonen | H04L 12/185 370/352 |
| 2005/0220079 A1* | 10/2005 | Asokan | H04W 76/025 370/352 |
| 2006/0019655 A1* | 1/2006 | Peacock | H04W 92/02 455/426.1 |
| 2006/0035656 A1* | 2/2006 | Sung | H04W 4/10 455/518 |
| 2006/0040689 A1* | 2/2006 | Yoon | H04W 76/005 455/518 |
| 2006/0040694 A1* | 2/2006 | Yoon | H04M 3/46 455/519 |
| 2006/0053225 A1* | 3/2006 | Poikselka | H04L 12/1818 709/227 |
| 2006/0079260 A1* | 4/2006 | Tillet | H04W 4/08 455/518 |
| 2006/0101116 A1* | 5/2006 | Rittman | H04L 12/1813 709/204 |
| 2006/0234744 A1* | 10/2006 | Sung | H04W 8/186 455/518 |
| 2007/0019595 A1* | 1/2007 | Huh | H04L 12/1818 370/338 |
| 2007/0049257 A1* | 3/2007 | Patel | H04M 3/4288 455/414.1 |
| 2007/0049314 A1* | 3/2007 | Balachandran | H04W 4/10 455/518 |
| 2007/0087769 A1* | 4/2007 | Takahashi | H04W 4/08 455/518 |
| 2007/0195735 A1* | 8/2007 | Rosen | H04W 76/005 370/335 |
| 2007/0249381 A1* | 10/2007 | Forslow | H04W 72/005 455/517 |
| 2007/0276947 A1* | 11/2007 | Panattu | H04L 65/4061 709/227 |
| 2008/0081604 A1* | 4/2008 | Sung | H04L 65/4061 455/422.1 |
| 2008/0168361 A1* | 7/2008 | Forstall | G06F 3/0488 715/753 |
| 2008/0220765 A1* | 9/2008 | Chu | H04L 65/4061 455/422.1 |
| 2008/0298294 A1* | 12/2008 | Gonsa | H04L 12/1818 370/312 |
| 2010/0011122 A1* | 1/2010 | Rosen | H04W 4/10 709/239 |
| 2010/0166170 A1* | 7/2010 | East | H04M 1/2535 379/221.01 |
| 2011/0165905 A1* | 7/2011 | Shuman | H04W 4/02 455/518 |
| 2011/0231558 A1* | 9/2011 | Holm | H04L 65/4061 709/227 |
| 2011/0314145 A1* | 12/2011 | Raleigh | H04L 41/0893 709/224 |
| 2013/0136037 A1* | 5/2013 | Yang | H04W 4/16 370/260 |
| 2013/0150115 A1* | 6/2013 | Maggenti | H04M 1/656 455/518 |
| 2013/0151622 A1* | 6/2013 | Goel | H04L 12/1822 709/205 |
| 2013/0155875 A1* | 6/2013 | Ayyasamy | H04W 76/005 370/242 |
| 2013/0165171 A1* | 6/2013 | Pai | H04M 3/42374 455/518 |
| 2014/0066118 A1* | 3/2014 | Pai | H04W 4/10 455/518 |
| 2014/0233447 A1* | 8/2014 | Ofir | H04W 4/10 370/312 |
| 2015/0207766 A1* | 7/2015 | Lindner | H04L 51/06 709/206 |
| 2016/0029348 A1* | 1/2016 | Petrie | H04L 63/00 455/450 |
| 2016/0044064 A1* | 2/2016 | Pison | H04W 4/10 370/312 |
| 2016/0205519 A1* | 7/2016 | Patel | H04L 67/1002 455/518 |
| 2016/0227384 A1* | 8/2016 | Mazzarella | H04W 4/08 |
| 2016/0227588 A1* | 8/2016 | Patel | H04W 76/005 |
| 2016/0381491 A1* | 12/2016 | Watfa | H04W 8/005 455/41.2 |
| 2017/0034671 A1* | 2/2017 | Song | F03G 5/06 |
| 2017/0237600 A1* | 8/2017 | Patel | H04L 29/08693 |

OTHER PUBLICATIONS

3GPP TR 23.779 v0.8.0 "Study on application architecture to support Mission Critical Push to Talk over LTE (MCPTT) services," Jun. 2015, 248 pages.
3GPP TS 22.179 v13.0.1: "Mission Critical Push to Talk (MCPTT) over LTE (Stage 1)," Mar. 21, 2015, 76 pages.
3GPP TS 23.468 v12.3.0: "Group Communication System Enablers for LTE (GCSE_LTE); Stage 2," Dec. 2014, 26 pages.
Camarillo et al., "The Binary Floor Control Protocol (BFCP)," IETF RFC 4582, Nov. 2006, 65 pages.
Hautakorpi and Camarillo, "The Session Initiation Protocol (SIP) P-Refused-URI-List Private-Header (P-Header)," IETF RFC 5318, Dec. 2008, 12 pages.
OMA-AD-PCPS-V1_0: "Push to Communicate for Public Safety Architecture," Feb. 20, 2015, 65 pages.
OMA-AD-PoC-V1_0: "Push to talk over Cellular (PoC)— Architecture," Aug. 5, 2005, 167 pages.
OMA-AD-PoC-V2_0: "Push to talk over Cellular (PoC)— Architecture," Aug. 2, 2011, 50 pages.
OMA-AD-PoC-V2_1: "Push to talk over Cellular (PoC)— Architecture," Aug. 2, 2011, 67 pages.
OMA-TS-PoC_System_Description-V2_0: "OMA PoC System Description," Aug. 6, 2008, 23 pages.
OMA-TS-PoC_System_Description-V2_1: "OMA PoC System Description," Aug. 2, 2008, 67 pages.
OMA-TS-PoC_User_Plane-V2_1: "PoC User Plane," Dec. 22, 2009, 379 pages.
Rosenberg et al., "SIP: Session Initiation Protocol," IETF RFC 3261, Jun. 2002, 252 pages.
Schulzrinne et al., "TRP: A Transport Protocol for Real-Time Applications," IETF RFC 3550, Jul. 2003, 89 pages.
International Search Report and Written Opinion of the International Searching Authority issued in International Application No. PCT/US2015/039857 dated Oct. 5, 2016; 11 pages.

* cited by examiner

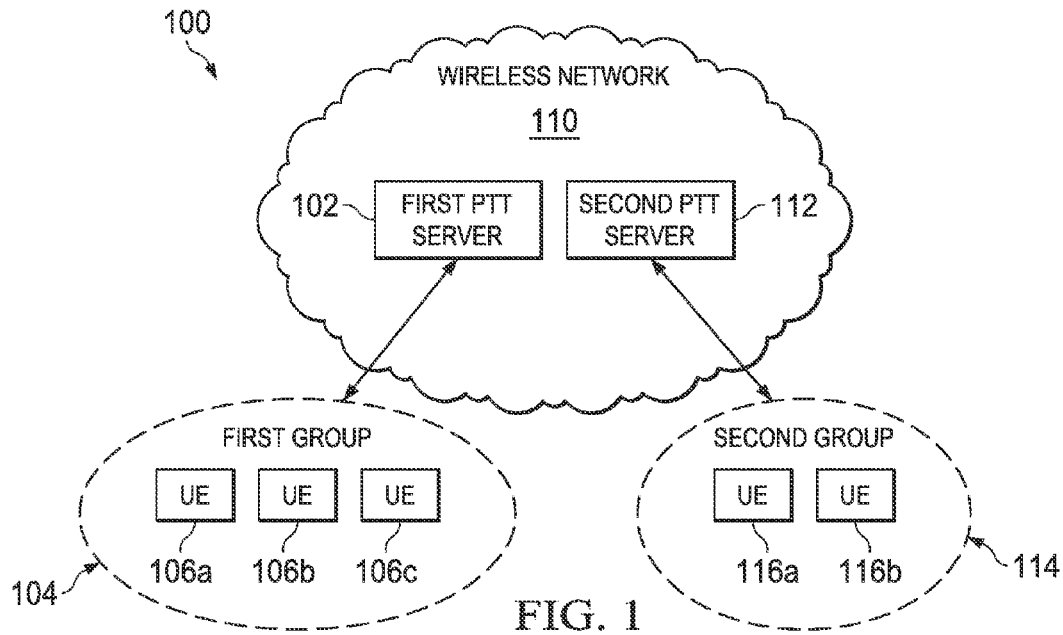

FIG. 1

```
SUBSCRIBE sip:user1_public1@home1.net SIP/2.0
Via: SIP/2.0/UDP [5555::aaa:bbb:ccc:ddd]:1357;comp=sigcomp;branch=z9hG4bKnashds7
Max-Forwards: 70
Route: <sip:pcscf1.visited1.net:7531;lr;comp=sigcomp>, <sip:orig@scscf1.home1.net;lr>
P-Preferred-Identity: "John Doe" <sip:user1_public1@home1.net>
P-Access-Network-Info: 3GPP-UTRAN-TDD; utran-cell-id-3gpp=234151D0FCE11
Privacy: none
From: <sip:user1_public1@home1.net>;tag=31415
To: <sip:user1_public@home1.net>
Call-ID: b89rjhnedlrfjflslj40a222
Require: sec-agree
Proxy-Require: sec-agree
CSeq: 61 SUBSCRIBE
Event: group_members
Expires: 600000
Accept: application/reginfo+xml
Security-Verify: ipsec-3gpp; q=0.1; alg=hmac-sha-1-96; spi-c=98765432; spi-s=87654321; port-c=8642; port-s=7531
Contact: <sip:[5555::aaa:bbb:ccc:ddd]:1357;comp=sigcomp>
Content-Length: 0
```

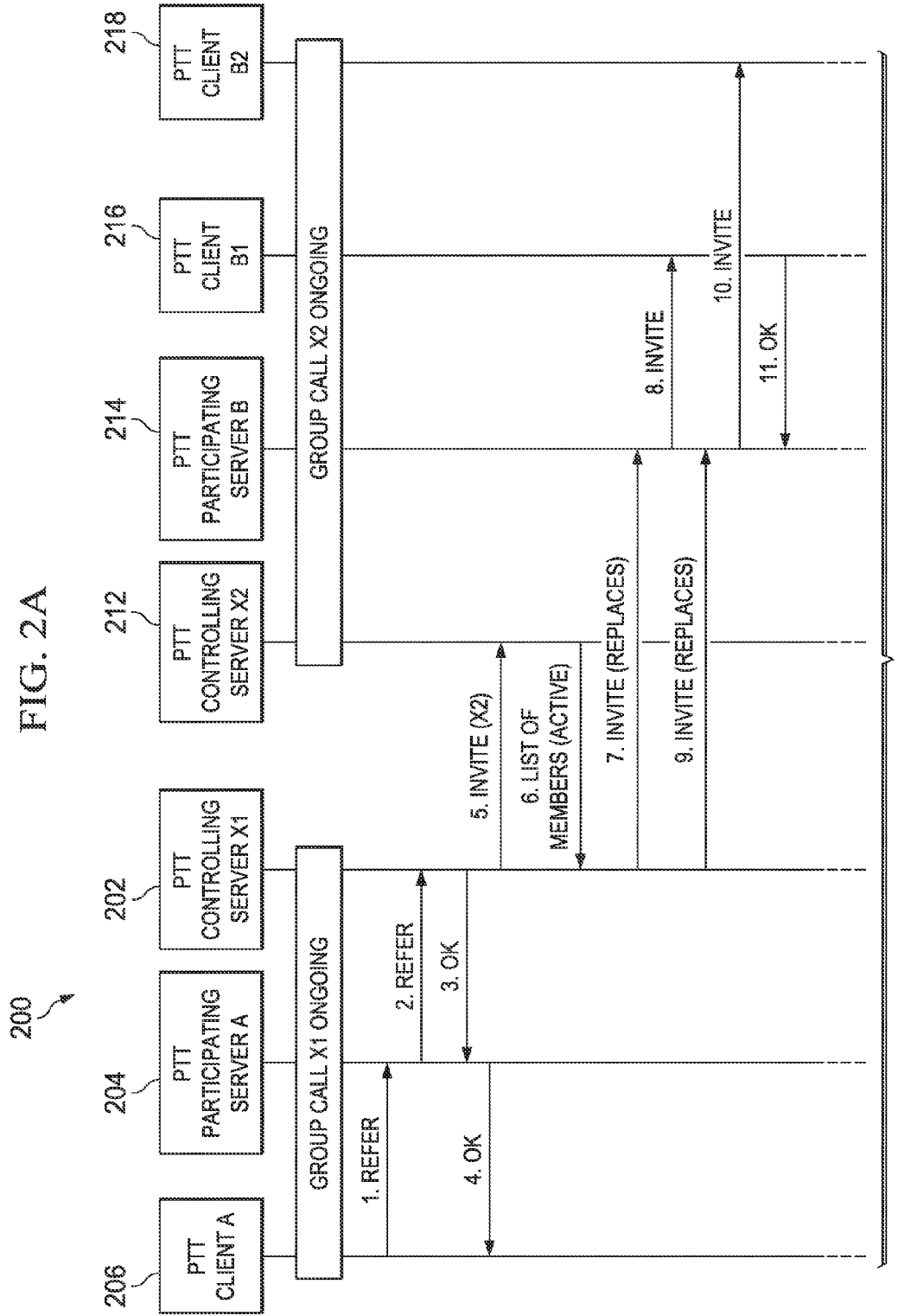

```
NOTIFY sip:[5555::aaa:bbb:ccc:ddd]:1357;comp=sigcomp SIP/2.0
Via: SIP/2.0/UDP scscf1.home1.net;branch=z9hG4bK332b23.1
Max-Forwards: 70
Route: <sip:pcscf1.home1.net;lr>
From: <sip:user1_public1@home1.net>;tag=31415
To: <sip:user1_public1@home1.net>;tag=151170
Call-ID:
CSeq: 42 NOTIFY
Subscription-State: active;expires=600000
Event: reg
Content-Type: application/groupmembers+xml
Contact: <sip:scscf1.home1.net>
Content-Length: (...)

<?xml version="1.0"?>
<groupmembers xmlns="urn:ietf:params:xml:ns: group_membersinfo"
              version="1" state="full">
    <member ="sip:user1_public1@home1.net" state="active">
        <contact>
            <uri>sip:[5555::aaa:bbb:ccc:ddd]</uri>
        </contact>
    </members>
    <member ="sip:user1_public2@home1.net" state="active">
        <contact>
            <uri>sip:[5555::aaa:bbb:ccc:ddd]</uri>
        </contact>
    </members>
    <member ="tel:+358504821437" state="inactive">
    </member>
</groupmembers>
```

```
NOTIFY sip:[5555::aaa:bbb:ccc:ddd]:1357;comp=sigcomp SIP/2.0
........

<?xml version="1.0"?>
<groupmembers xmlns="urn:ietf:params:xml:ns: group_membersinfo"
              version="1" state="full">
    <member ="sip:user1_public1@home1.net" state="active">
        <contact">
            <uri>sip:[5555::aaa:bbb:ccc:ddd]</uri>
            <TMGI-value id="100">"
        </contact>
    </members>
    <member ="sip:user1_public2@home1.net" state="active">
        <contact>
            <uri>sip:[5555::aaa:bbb:ccc:ddd]</uri>
            <TMGI-value id="100">"
        </contact>
    </members>
    <member ="tel:+358504821437" state="inactive">
    </member>
</groupmembers>
```

```
<member ="sip:user1_public2@home1.net" state="active">
    <contact>
        <uri>sip:[5555::aaa:bbb:ccc:ddd]</uri>
        <Queue position="100">"
        <privierage level="1">"
        <timestamp="23:04)31 UTC">"
    </contact>
</member>
```

FIG. 6

MERGING ACTIVE GROUP CALLS

TECHNICAL FIELD

This disclosure relates to data transmission in wireless communication systems and, more specifically, to merging active group calls.

BACKGROUND

In some cases, a Push to talk (PTT) service may provide an arbitrated service for two or more users that engage in a communication. For example, a user in a group call may request permission to transmit media, e.g., voice, video, or other multi-media contents. In some cases, the user may request the permission by pressing a button on a device, which sends a request to a server. The server may determine whether to grant the user permission to transmit and send a grant message to the user. Examples of PTT service may include the Mission Critical PTT (MCPTT) service that may be suitable for mission critical scenarios. In some cases, the MCPTT service may use The Third Generation Partnership Project (3GPP) transport communication mechanisms provided by the Evolved Packet System (EPS) architectures to establish, maintain, and terminate the actual communication paths among the users. In some cases, the MCPTT service may use non-3GPP, e.g., dispatcher or administer, access technologies and architectures. Examples of PTT service may also include non-mission critical PTT services.

DESCRIPTION OF DRAWINGS

FIG. 1 is an example wireless communication system that merges active group calls according to an implementation.

FIGS. 2A-2B are a data flow diagram illustrating an example process for merging active group calls according to an implementation.

FIG. 3 illustrates an example subscribe request according to an implementation

FIG. 4 illustrates an example notify message according to an implementation.

FIG. 5 illustrates an example portion of a notify message indicating the bearer information according to an implementation.

FIG. 6 illustrates an example portion of a notify message indicating the pending requests according to an implementation.

Like reference numbers and designations in the various drawings indicate like elements.

DETAILED DESCRIPTION

Figure 2B:
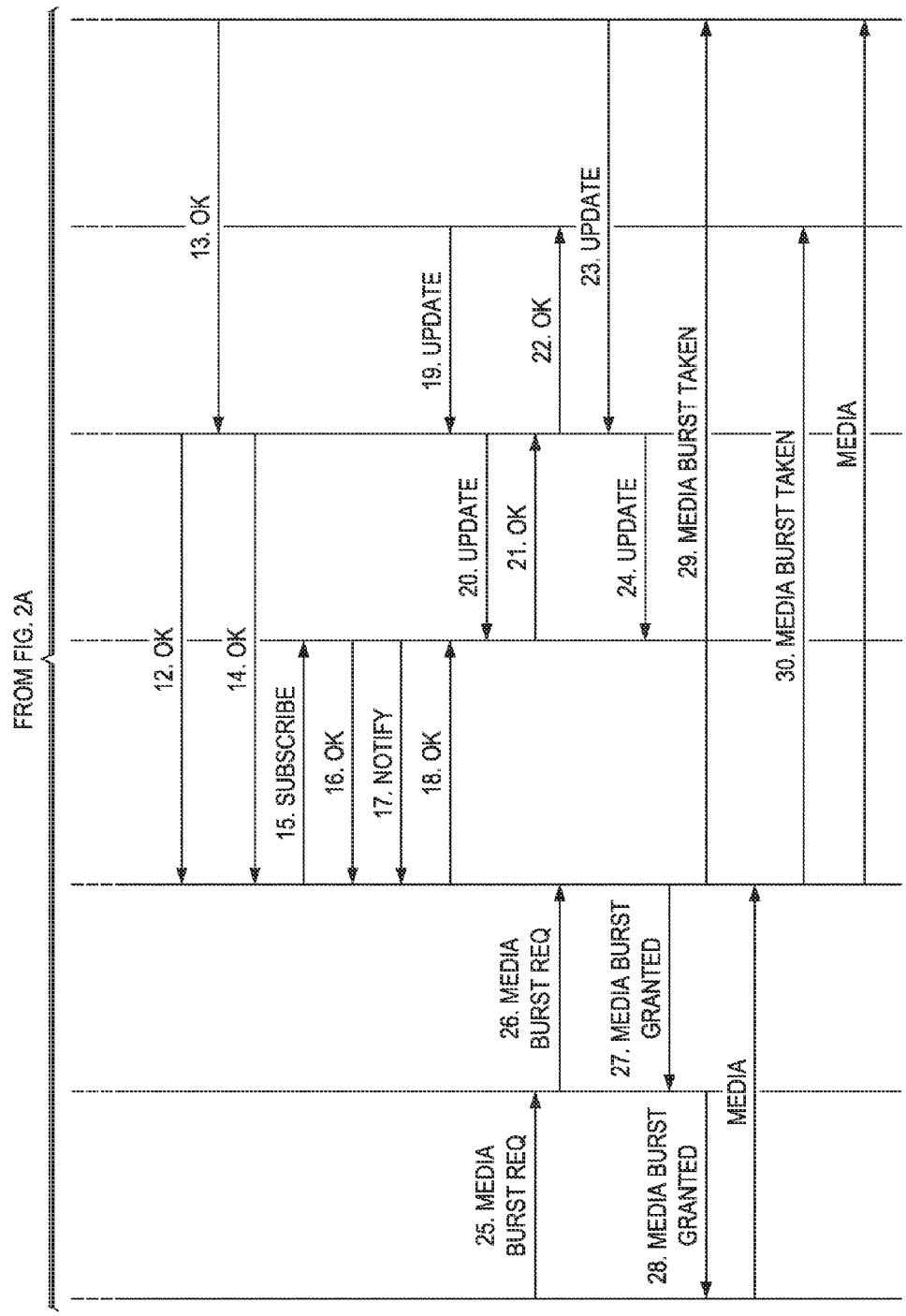

The present disclosure is directed to merging active group calls. In some cases, multiple PTT groups may be temporarily merged. For example, when an incident occurs in an area, different PTT groups may be merged so that members in these different PTT groups can communicate with one another. In some cases, an ad hoc group or a pre-arranged group may be formed to include different PTT groups. An adhoc group call is one where the members of the group are included in the request that initiates the call. A pre-arranged group is one where a group list of members is pre-defined and the call is initiated by including the URI associated with the group in the request that initiates the call. The users in these different PTT groups may be invited to join the ad hoc group call or the pre-arranged group call. After the incident, the ad hoc group or the pre-arranged group call may be cancelled.

In some cases, two or more PTT groups have active group calls and would like to merge their active group calls in a merged group call. Using an ad hoc group call or a pre-arranged group call for a merged call may lose the status of the active group calls. For example, the ad hoc group call or the pre-arranged group call approach may invite all the members of the PTT groups, including the members who are not participating in the current active group calls. In addition, the metadata information of the active group calls, e.g., the queue information, may be lost in the ad hoc group call or the pre-arranged group call.

In some cases a type of group known as a chat group may be used for PTT calls. Different to an adhoc group or pre-arranged group where the members are invited to join the group call at the start of the call in a chat group the group members have to request to join (in a similar way as in a dial in conference).

In some cases of pre-arranged and chat groups as well as having a list of authorized members to be invited or allowed to join the group call the authorized members may have to affiliate to the group to indicate a current interest to be invited to a group call. The active participants in a group call may be a subset of those affiliated to the group since some affiliated members may not be able to participate in the call (e.g. due to being out of radio coverage or the user not accepting the invitation to join).

In some cases, multiple chat groups may need to be merged and authorized members from other groups may attempt to join the merged chat group call (e.g. by sending an invite to the PTT server to join the merged chat group call hosted by the server). However, the hosting server of the chat group call may not have access to group information, e.g., the member list, of other PTT groups that host their active group calls in a different server. Therefore, the hosting server may not be able to invite or authorize the members from the other PTT groups to join the chat group call. Also authorized members of a chat group may not be aware that the chat group has been merged into a temporary chat group call. Therefore a means is needed to either indicate to all authorized members that the chat group has been merged into temporary chat group call or to redirect members that attempt to join the original chat group that they need to join the merged temporary chat group call.

FIG. 1 is an example wireless communication system 100 that merges active group calls according to an implementation. For example, a first Push to talk (PTT) server may already be hosting a first active group call or be in the process of establishing a new group call comprising multiple groups. A first group of PTT clients may already be participating in the first active group call. The first PTT server may need to invite a second group of PTT clients as part of the establishment of a new group call comprised of multiple groups or may receive a request to invite a second group of PTT clients to the already established group call. The request to establish a new group call comprised of multiple groups or the request to invite a second group of PTT clients may include an identifier for the second group of PTT clients. The first PTT server may send a first invite message to a second PTT server. The second PTT server may host a second active group call. The first invite message may include the identifier for the second group of PTT clients. The second group of PTT clients participates in the second active group call. In response to the first invite message, the first PTT server may receive a response message containing a list of members of the second group. The response message may indicate which members of the second group of PTT clients are affiliated to the group. The response may indicate that the group is currently in an active group call. The response message may indicate which members of the second group of PTT clients are participating in the second active group call.

In some implementations, the first PTT server may send a second invite message. The second invite message may invite at least one PTT client of the second group of PTT clients to the merged PTT group call. The second invite message may indicate that the merged PTT group call replaces or suspends the second active group call. In some cases multiple instances of the second invite message may be sent and addressed individually to each PTT client of the second group of PTT clients. In some cases, the second invite message may be sent over a Multimedia Broadcast/Multicast Service (MBMS) channel.

In some implementation the first invite message to a second PTT server may contain an indication to the second PTT server that if the group is in an active call that a second invite message is requested be sent by the second PTT server to the second group of PTT clients to the merged PTT call. In this case the first and second invite message contains the necessary identifiers for the PTT Clients to join the merged PTT call.

In some implementations, the first PTT server may send a subscribe request to the second PTT server. In response to the subscribe request, the first PTT server may receive a notify message. The notify message may include metadata of the second group of PTT clients. In some cases, the metadata may indicate one or more pending requests to send media from members of the second group of PTT clients. The pending request(s) may be received at the second PTT server prior to the first invite message. In some cases, the metadata may indicate at least one of a timestamp, a queue position, or a priority of each of the pending requests. In some cases, the metadata may indicate a Multimedia Broadcast/Multicast Service (MBMS) bearer that is used by at least one PTT client of the second group of PTT clients for the second active group call.

The first PTT server may host a merged PTT group call that may have participants from the first group of PTT clients and the second group of PTT clients.

Merging active group calls according to methods and systems described herein may provide one or more advantages. For example, the call status information of the second group call is transferred to the first PTT server. Therefore, the first PTT server may invite just the affiliated members or those members that are actually participating in the second group call. In some cases the authorized members of a group might be very large but the actual affiliated members and active participants in the call may be much smaller so there is a big advantage to only inviting the affiliated members of the group or active participants in the group call. In addition, the first PTT server may also obtain the information of the pending requests in the second group call and may process these pending requests in the merged call and consolidate the pending requests from the first group call with the pending request from the second group call according to the timestamps, relative queue positions or and priorities of the requesting participants from both group calls. Furthermore, using an MBMS channel to invite the members that are participating in the second group call to the merged call may save resources and improve efficiency of the communication system and inviting individually a very large number of participants to join is impractical in a reasonable time.

At a high level, the example wireless communication system 100 includes a wireless communication network 110, which includes a first PTT server 102 and a second PTT server 112. The example wireless communication system 100 also includes User Equipments (UEs) 106a-c and UEs 116a-b. In some cases, each of the UEs 106a-c and UEs 116a-b may include a PTT client. The wireless communication system 100 may also include UEs that are non-wireless devices such as a PTT Dispatch Console that may be connected to the wireless network using a fixed access technology such as Ethernet or a WLAN. A PTT client may represent an application, set of applications, software, software modules, hardware, or combination thereof that can be configured to communicate with a PTT server for PTT services. As illustrated, the UEs 106a-c are included in the first group 104 and the UEs 116a-b are included in the second group 114. In some cases, the first group 104 has a first ongoing group call that is participated by the UEs 106a-c, and the second group 114 has a second ongoing group call that is participated by the UEs 116a-b.

The example wireless communication system 100 also includes a first PTT server 102 that hosts the first group call and a second PTT server 112 that hosts the second group call. In some cases, a PTT server, e.g., the first PTT server 102 or the second PTT server 112, may provide a participating function, controlling function, terminating function, or a combination thereof for PTT service. For example, in some cases, a PTT server may provide a participating function for an associated PTT client. In these or other cases, the PTT server may be in the same service domain as the associated PTT client. Example of a service domain may be a network or a portion of a network. For example, the PTT server may be an application server in the home core network of a PTT client. The PTT server may have access to the associated PTT client's configurations and settings. The PTT server may also perform media replication function, the traffic optimization function, or a combination thereof for the associated PTT client.

In some cases, a PTT server may provide a controlling function for a group call. In these or other cases, the PTT server may act as the host of the group call. The PTT server may perform the Media Burst Control Arbitration function, e.g., the Media Burst Control or Floor Control function, to receive and arbitrate requests to send media in a group call. The PTT server may also perform media replication function, the traffic optimization function, or a combination thereof for the group call.

In some cases, the PTT servers that perform the participating function and the controlling function may be collocated in the same entity, e.g., the first PTT server 102 and the second PTT server 112 illustrated in FIG. 1. Alternatively, the PTT servers that perform the participating function and the controlling function may be located in the different entity in the network architecture. In some cases, as illustrated, the first PTT server 102 and the second PTT server 112 may be located in the same wireless network. Alternatively, the first PTT server 102 and the second PTT server 112 may be located in different wireless networks.

In some cases, the PTT servers and the PTT clients may be implemented in accordance with the PTT over Cellular (PoC) or Push to Communicate for Public Safety (PCPS) standard. The PoC and PCPS standards were developed by Open Mobile Alliance (OMA) to provide PTT service over Internet Protocol (IP) based cellular networks. In some cases the PTT servers and the PTT clients may be implemented in accordance with the Mission Critical PTT (MCPTT) standard under development by 3GPP.

In operation, the first PTT server 102 receives a request to invite UEs in the second group 114. The request may include an identifier for the second group 114. The first PTT server 102 sends a first invite message to the second PTT server 112. The first invite message may include the identifier for the second group 114. In response to the first invite message, the first PTT server 102 receives a response message. The response message may indicate that the second group 114 has an active group call. The first PTT server 102 sends a second invite message to at least one of the UEs 116a-b to invite the at least one of the UEs 116a-b to the merged PTT group call. The second invite message may indicate that the merged PTT group call replaces or suspends the active group call. The first PTT server 102 may host a merged PTT group call that may be participated by the UEs 106a-c and the UEs 116a-b. FIGS. 2-12 and associated descriptions provide additional details for these implementations.

Turning to a general description of the elements, a UE may be referred to as a mobile electronic device, user device, mobile station, subscriber station, portable electronic device, mobile communications device, wireless modem, PTT dispatch console or wireless terminal. Examples of a UE (e.g., the UEs 106a-c and the UEs 116a-b) may include a cellular phone, personal data assistant (PDA), smart phone, PTT dispatch console, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), other access networks such as fixed Ethernet or IEEE 802.11 WLAN, core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a UE to communicate. The base station may be distributed throughout the cellular network to provide a wide area of coverage. The base station directly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 10:
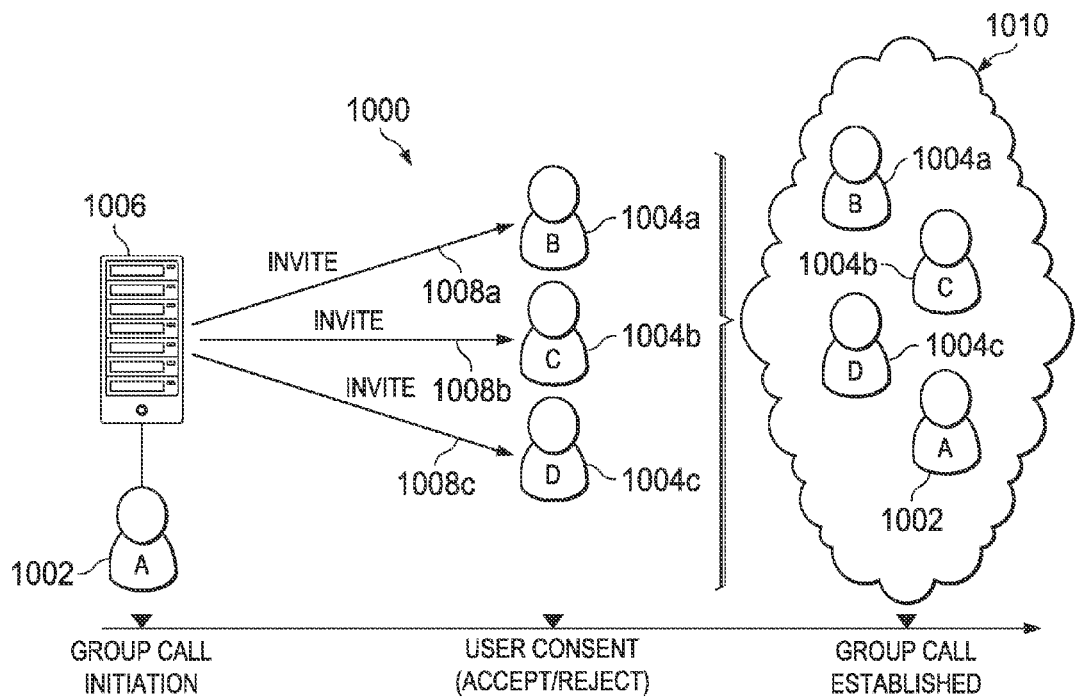
FIG. 10 illustrates an example ad hoc PTT group call.

FIG. 10 illustrates an example ad hoc PTT group call. The system 1000 for an ad hoc PTT group call may involve a PTT client 1002 that acts as a group call initiator, a number of PTT clients 1004a-c that will participate in the group call, and a PTT server 1006. The group call initiator 1002 may send an invite message to the PTT server 1006 to initiate the group call. The invite message may include a list of PTT clients that will be invited to the group call. The PTT server 1006 then sends invite requests 1008a-c to the PTT clients 1004a-c to form a group call 1010.

Figure 11:
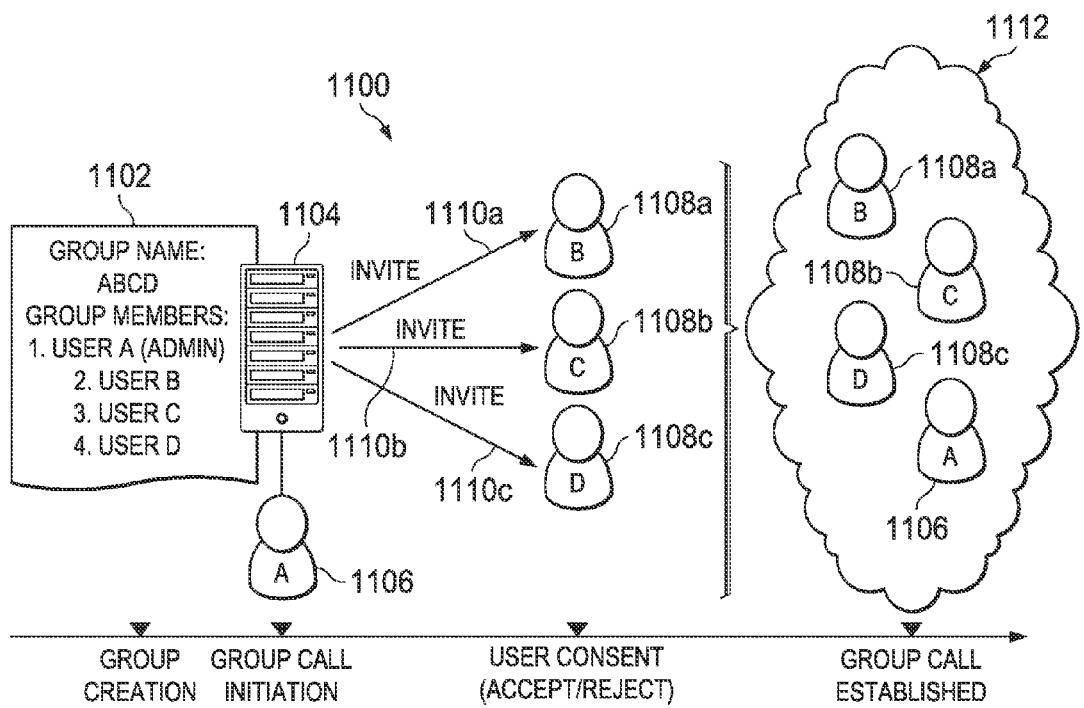
FIG. 11 illustrates an example pre-arranged PTT group call.

FIG. 11 illustrates an example pre-arranged PTT group call. The system 1100 for a pre-arranged PTT group call may involve a PTT server 1104, a PTT client 1106 that acts as a group call initiator, and a number of PTT clients 1108a-c that will participate in the group call. A list of PTT clients 1102 of the pre-arranged group is pre-provisioned in the PTT server 1104. The group call initiator 1106 may send an invite message to the Uniform Resource Indicator (URI) for the group. The PTT server 1104 that hosts the group then sends invite message to the PTT clients 1108a-c in the pre-arranged group to form a group call 1112.

Figure 12:
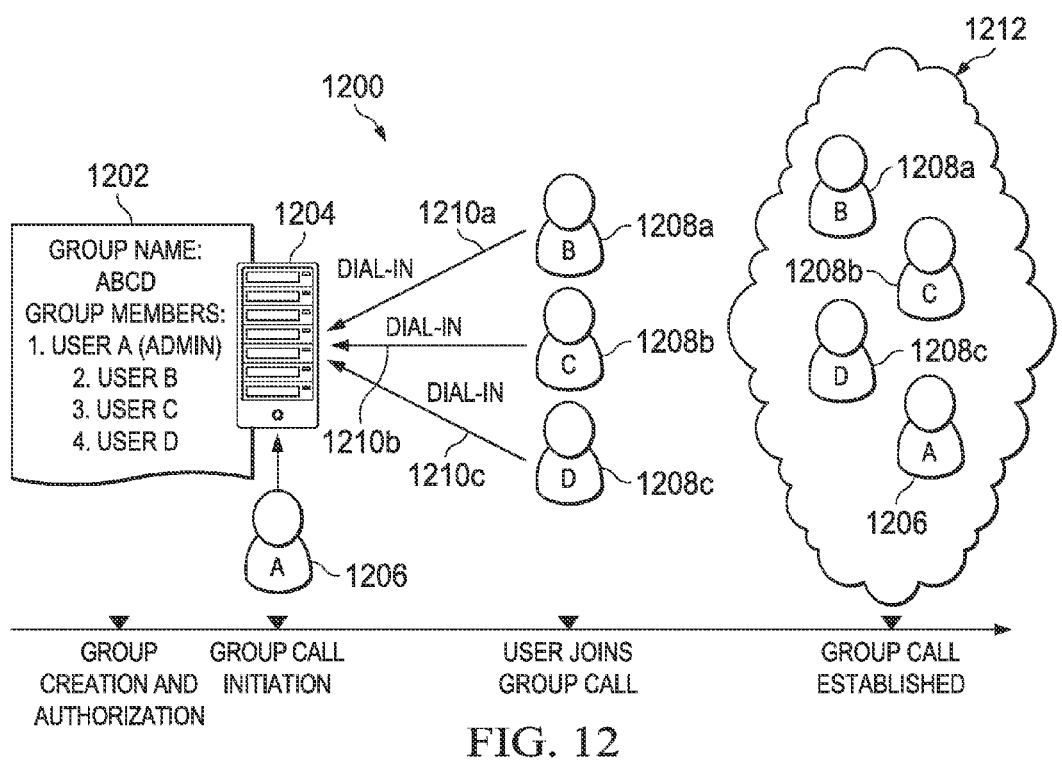
FIG. 12 illustrates an example chat PTT group call.

FIG. 12 illustrates an example chat PTT group call. The system 1200 for a chat PTT group call may involves a PTT server 1204, a PTT client 1206 that acts as a group call initiator, and a number of PTT clients 1208a-c that will participate in the group call. In a restricted chat PTT group call, a list of PTT clients 1202 is pre-provisioned in the PTT server 1204. The PTT clients that would like to join the group call send invite messages or dial-in messages 1210a-c to the URI for the group to form a group call 1212. In a restricted chat PTT group call, the PTT server 1204 that hosts the group checks whether the requesting PTT client is in the pre-provisioned list. In the unrestricted chat PTT group call there is no pre-provisioned list and any PTT client can join. These long-lived semi-permanent chat group calls are likely to be a common type of group call used by public safety agencies.

FIGS. 2A-2B are a data flow diagram illustrating an example process 200 for merging active group calls according to an implementation. The data flow diagram includes a PTT controlling server X1 202. The PTT controlling server X1 202 represents an application, set of applications, software, software modules, hardware, or combination thereof that can be configured to provide a controlling function for an active group call, e.g., the active group call X1 as illustrated in FIG. 2. In some cases, a group of PTT clients, e.g., the group X1, may participate in the active group call X1. For example, as illustrated, the group X1 may include a PTT client A 206. The data flow diagram also includes a PTT participating server A 204. The PTT participating server A 204 represents an application, set of applications, software, software modules, hardware, or combination thereof that can be configured to provide a participating function for the PTT client A 206. In some cases, the PTT controlling server X1 202 and the PTT participating server A 204 may be implemented on the same PTT server. In these or other cases, the messages between the PTT controlling server X1 202 and the PTT participating server A 204 shown in the data flow diagram may be omitted.

The data flow diagram also includes a PTT controlling server X2 212 that provides a controlling function for an active group call X2. In some cases, another group of PTT clients, e.g., the group X2, may participate in the active group call X2. For example, as illustrated, the group X2 may include a PTT client B1 216 and a PTT client B2 218. The data flow diagram also includes a PTT participating server B 214 that provides a participating function for the PTT client B1 216 and the PTT client B2 218. In some cases, the PTT controlling server X2 212 and the PTT participating server B 214 may be implemented on the same PTT server. In these or other cases, the messages between the PTT controlling server X2 212 and the PTT participating server B 214 shown in the data flow diagram may be omitted.

As shown in FIGS. 2A-2B, before step 1, both the active group calls X1 and X2 are ongoing. At step 1, the PTT client A 206 sends a request to the PTT participating server A 204 to invite the group X2 to the active group call X1. In some cases, the request may be a Refer request. In some cases the request may include an identifier for the group X2. Examples of the identifiers may include a Uniform Resource Indicator (URI) or any other group identity indicators. In some cases, the URI may be a string of characters used to identify the group X2. In some cases, the identifier may be included in a Refer-To header field of the Refer request. In some cases, the request may be sent by an authorized PTT client in the group X1, e.g., the PTT client A 206 as illustrated. Alternatively or in combination, the request may be sent by a dispatcher that is not in the group X1. Alternatively or in combination, the request may be sent by a Group Management Server based upon creation of merged group of X1 and X2 in the Group Management Server in order to merge the group calls of X1 and X2.

At step 2, the PTT participating server A 204 forwards the request to the PTT controlling server X1 202. At step 3, the PTT controlling server X1 202 sends an OK response to the PTT participating server A 204, which forwards it to the PTT client A 706 at step 4. In some cases, the OK response indicates that the PTT controlling server X1 202 has received the request.

At step 5, the PTT controlling server X1 202 sends an invite message to the PTT controlling server X2 212. In some cases, the invite message may include the identifier of the group X2. In responding to the invite message, at step 6, the PTT controlling server X2 212 sends a response message to the PTT controlling server X1 202. In some cases, the response message may be a 4xx message, e.g., a 403 message. In some cases, the response message may include an indication that the group X2 is currently in an active group call. In some cases, the indication that the group X2 is currently in an active group call may be encoded using Extensible Markup Language (XML). Alternatively or in combination, the indication may be encoded in one or more existing or new header fields in the response message. In some cases, the response message may also include a list of PTT clients in the group X2. In some cases, the list of PTT clients may be encoded using Extensible Markup Language (XML). Alternatively or in combination, the list of PTT clients may be encoded in one or more existing or new header fields in the response message.

In some cases, some of the PTT clients in the group X2 are currently participating in the active group call X2, while some other PTT clients in the group X2 are authorized to participate but are not currently participating in the current active group call X2 yet. In some cases some of the PTT clients in the group X2 are affiliated to the group but are not currently participating in the active group call X2 In these or other cases, the response message may include a list of the PTT clients in the group X2, and one or more indications to indicate whether the PTT clients in the group X2 are currently participating in the group call X2 or are currently affiliated to the group X2. Therefore, the PTT clients that are currently participating in or affiliated to the active group call X2 may be invited to the merged call. The PTT clients in the group X2 who are not participating in the group call X2 may be authorized to join the merged call later. This approach enables the PTT controlling server X1 202 to merge the active participants or affiliated members of group calls X1 and X2 without inviting all the authorized members of the groups X1 and X2.

Alternatively or in combination, the PTT controlling server X1 202 may use a subscribe-notify procedure to obtain the information of the members in the group X2 that are currently participating in the active group call X2. For example, the PTT controlling server X1 202 may send a subscribe request to the PTT controlling server X2 212 requesting data about the PTT clients in the group X2. The subscribe request may include an identifier for the group X2. FIG. 3 illustrates an example subscribe request 300 according to an implementation. As shown in FIG. 3, the subscribe request 300 may include an event identity (ID) field. The event ID field may indicate that the event is group_members, which informs the PTT controlling server X2 212 that the information of the group members in a group is requested.

In response to the subscribe request, the PTT controlling server X2 212 may send a notify message to the PTT controlling server X1 202. The notify message may indicate the PTT clients that are currently participating in the active group call X2 and the PTT clients that are authorized but have not joined yet. FIG. 4 illustrates an example notify message 400 according to an implementation. As shown in FIG. 4, the notify message 400 may include a list of group members in the group X2. For each group member, the notify message 400 may include the identity of the member, e.g., the Session Initiation Protocol (SIP) URI of the member, and a status indicator. The status indicator may be set to "active" for the member that is currently participating in the group call X2. The status indicator may be set to "inactive" for the member that is not currently participating in the group call X2. The status indicator may be set to "affiliated" for the member that is affiliated but not currently participating in the group call X2.

In some cases, the notify message may also indicate information about the bearer that the members in the group X2 use to participate in the active group call X2. FIG. 5 illustrates an example portion of a notify message 500 indicating the bearer information according to an implementation. As shown in FIG. 5, the notify message 500 may include a Temporary Multicast Group Identity (TMGI) for each member of the group X2 that is actively participating in the group call X2. The TMGI may indicate a Multimedia Broadcast/Multicast Service (MBMS) bearer that is used by the active member in the group call X2. In some cases, the subscribe-notify procedure may be combined with steps 15-18 discussed below.

At step 7 and 9, the PTT controlling server X1 202 invites the PTT clients in the group X2 that are actively participating in the active group call X2 to participate in the merged call. For example, at step 7, the PTT controlling server X1 202 sends an invite message to the PTT participating server B 214, which forwards the invite message to the PTT client B1 216 at step 8. Similarly, at step 9, the PTT controlling server X1 202 sends an invite message to the PTT participating server B 214, which forwards the invite message to the PTT client B2 218 at step 10. The invite message at steps 7 and 9 contain the necessary identifiers for the PTT Clients to join the merged PTT call.

In some cases the invite message sent at step 5 may indicate that if the group is in an active group call that the PTT controlling server X2 212 should invite the active members of group call X2. In this case the invite messages at step 7 and 9 are sent by the PTT controlling server X2 212 instead of the PTT controlling server X1 202. In this case the invite message at steps 5, 7 and 9 contain the necessary identifiers for the PTT Clients to join the merged PTT call.

In some cases, the invite message may indicate that the invitation is for a merged call that replaces or suspends the active group call X2. If the merged call replaces the active group call X2, then the active group call X2 may terminate when the PTT clients who participate in the active group call X2 have joined the merged call. If the merged call suspends the active group call X2, then the active group call X2 may be put on hold when the PTT clients who participate in the active group call X2 have joined the merged call. When the merged call terminates, the active group call X2 may be resumed. In some cases, the indication that the merged call replaces or suspends the active group call X2 may be encoded using Extensible Markup Language (XML). Alternatively or in combination, the indication may be encoded in one or more existing or new header fields in the response message.

In some cases, the invite message may also indicate whether a unicast bearer or a multicast bearer is used for the merged call. If a multicast bearer is used, the invite message may include a TMGI that is associated with the multicast bearer to be used.

At step 11, the PTT client B1 216 sends an OK message to the PTT participating server B 214, which forwards the OK message to the PTT controlling server X1 202 at step 12. Similarly, at step 13, the PTT client B2 218 sends an OK message to the PTT participating server B 214, which forwards the OK message to the PTT controlling server X1 202 at step 14. The OK messages may indicate that the PTT client has received the invite message.

At step 15, the PTT controlling server X1 202 may send a subscribe request to the PTT controlling server X2 212 to request metadata information of the group X2. The subscribe request may include an identifier for the group X2. At step 16, the PTT controlling server X2 212 sends an OK message to the PTT controlling server X1 202 to indicate that the subscribe request is received. At step 17, the PTT controlling server X2 212 sends a notify message to the PTT controlling server X1 202. The notify message may include the metadata information of the group X2. In some cases, the metadata information may include information about pending requests to send media in the active group call X2 that are stored in the PTT controlling server X2 212. For example, one or more members may request to send media in the active group call X2 before the PTT controlling server X2 212 receives the invite message at step 5. By receiving information of the pending requests such as timestamp, queue position and priority, the PTT controlling server X1 can place these requests in the queue ordered appropriately with the pending requests in the active group call X1 and process accordingly.

FIG. 6 illustrates an example portion of a notify message 600 indicating the pending requests according to an implementation. As shown in FIG. 6, the notify message 600 may indicate the PTT floor request queue information of a pending request. The queue information may include the queue position, the priority, the timestamp, or a combination thereof for the pending request. In some cases, a level of privilege may be used to indicate the priority.

In some cases, as discussed previously, the notify message may also indicates the bearer information that is used by the PTT clients for the active group call X2. For example, the notify message may include a TMGI for the MBMS bearer that is used by an active member participating in the active group call X2.

At step 19, the PTT client B1 216 sends an update to the PTT participating server B 214, which forwards the update to the PTT controlling server X2 212 at step 20. In some cases, the update may indicate that the PTT client B1 216 will place the session it has with the active group call X2 on hold. Alternatively or in combination, an invite message may be used to indicate that the session it has with the group call X2 is put on hold. In some cases, for example, the active group call X2 may be replaced by the merged call. In these or other cases, the PTT client B1 216 may send a Bye message to indicate that the session it has with the active group call X2 is to be terminated. At step 21, the PTT controlling server X2 212 sends an OK response to the PTT participating server B 214, which forwards the OK response to the PTT client B1 216 at step 22. The OK response indicates that the update is received. Similarly, at step 23, the PTT client B2 218 sends an update to the PTT participating server B 214, which forwards the update to the PTT controlling server X2 212 at step 24. Accordingly, the PTT controlling server X2 212 may put the active group call X2 on hold or terminate the active group call X2 when the PTT controlling server X2 212 receives an update, invite, or bye from all the active members that are participating in the active group call X2.

At step 25, the PTT client A 206 may send a media burst request message to the PTT participating server A 204, which forwards the media burst request message to the PTT controlling server X1 202. The media burst request message may be used to request to send media in the merged group call. In some cases, the media burst request message may be sent using a Real-Time Control Protocol (RTCP) application (APP) packet. Alternatively or in combination, the media burst request message may be sent using Binary Floor Control Protocol (BFCP).

At step 27, the PTT controlling server X1 202 may determine to grant the request to send media. The PTT controlling server X1 202 may send a media burst granted message to the PTT participating server A 204, which forwards to the PTT client A 206 at step 28. The media burst granted message may be sent using an RTCP APP packet or BFCP. The PTT controlling server X1 202 may also send media burst taken messages to the PTT client B1 216 and the PTT client B2 218 to indicate that the media is taken by another PTT client in the merged group call. The media burst taken message may be sent using an RTCP APP packet or BFCP. Accordingly, the PTT client A 206 may send media to the PTT controlling server X1 202, which forwards the media to other members in the merged call, including the PTT client B1 216 and the PTT client B2 218.

Figure 7:
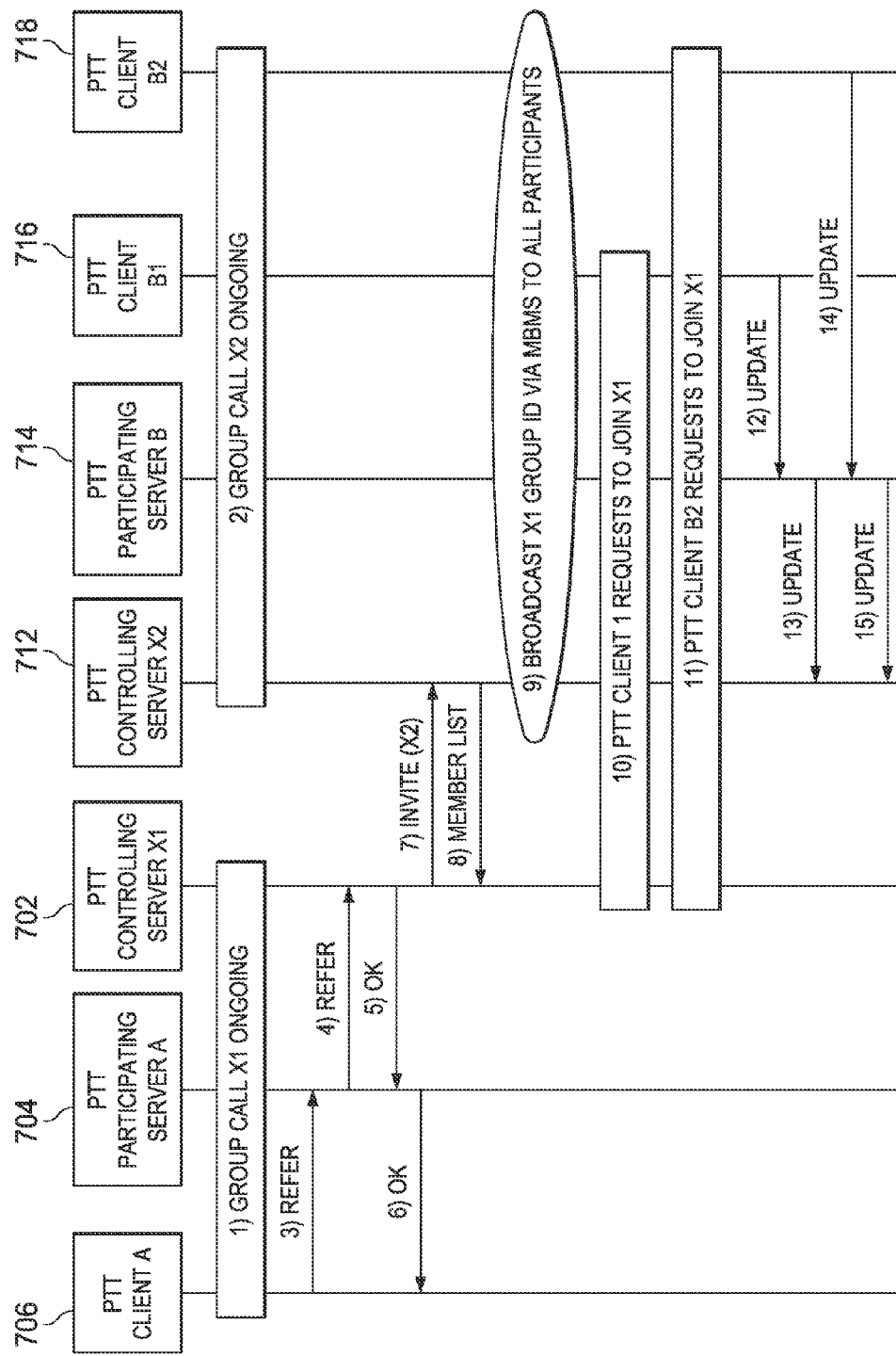
FIG. 7 is a data flow diagram illustrating an example process for merging active group calls using a broadcast message according to an implementation.

In some cases, instead of inviting the members of the active group call X2 individually to the merged call, an invite message may be broadcast to multiple members in the active group call X2. FIG. 7 is a data flow diagram illustrating an example process 700 for merging active group calls using a broadcast message according to an implementation. The data flow diagram includes a PTT controlling server X1 702 that hosts an active group call X1 and a PTT controlling server X2 712 that hosts an active group call X2. The data flow diagram also includes a PTT participating server A 704 associated with a PTT client A 706 that participates in the active group call X1. In some cases, the PTT controlling server X1 702 and the PTT participating server A 704 may be implemented on the same PTT server. The data flow diagram also includes a PTT participating server B 714 associated with a PTT client B1 716 and a PTT client B2 718. The PTT client B1 716 and the PTT client B2 718 participate in the active group call X2. In some cases, the PTT controlling server X2 712 and the PTT participating server B 714 may be implemented on the same PTT server.

As illustrated, the active group call X1 is ongoing at step 1 and the active group call X2 is ongoing at step 2. At step 3, the PTT client A 706 sends a request to the PTT participating server A 704 to invite the group X2 to the active group call X1. In some cases, the request may be a Refer request. In some cases the request may include an identifier for the group X2. Examples of the identifiers may include a Uniform Resource Indicator (URI) or any other group identity indicators. In some cases, the URI may be a string of characters used to identify the group X2. In some cases, the identifier may be included in a Refer-To header field of the Refer request. Alternatively or in combination, the request may be sent by a Group Management Server based upon creation of merged group of X1 and X2 in the Group Management Server in order to merge the group calls of X1 and X2.

At step 4, the PTT participating server A 704 forwards the request to the PTT controlling server X1 702. At step 5, the PTT controlling server X1 702 sends an OK response to the PTT participating server A 704, which forwards it to the PTT client A 706 at step 4.

At step 7, the PTT controlling server X1 702 sends an invite message to the PTT controlling server X2 712. In some cases, the invite message may include the identifier of the group X2. In responding to the invite message, at step 8, the PTT controlling server X2 712 sends a response message to the PTT controlling server X1 702. In some cases, the response message may include an indication that the group X2 is currently in an active group call. In some cases, the response message may also include a list of PTT clients in the group X2 and the information of whether each PTT client is currently active on the group call X2. In some cases, the response message may include an indication that the group X2 is currently in an active group call. In some cases, the indication that the group X2 is currently in an active group call may be encoded using Extensible Markup Language (XML). Alternatively or in combination, the indication may be encoded in one or more existing or new header fields in the response message. In some cases, the response message may also include a list of PTT clients in the group X2. In some cases, the list of PTT clients may be encoded using Extensible Markup Language (XML). Alternatively or in combination, the list of PTT clients may be encoded in one or more existing or new header fields in the response message.

In some cases, some of the PTT clients in the group X2 are currently participating in the active group call X2, while some other PTT clients in the group X2 are authorized to participate but are not currently participating in the current active group call X2 yet. In some cases some of the PTT clients in the group X2 are affiliated to the group but are not currently participating in the active group call X2 In these or other cases, the response message may include a list of the PTT clients in the group X2, and one or more indications to indicate whether the PTT clients in the group X2 are currently participating in the group call X2 or are currently affiliated to the group X2. Therefore, the PTT clients that are currently participating in or affiliated to the active group call X2 may be invited to the merged call. The PTT clients in the group X2 who are not participating in the group call X2 may be authorized to join the merged call later. This approach enables the PTT controlling server X1 702 to merge the active participants or affiliated members of group calls X1 and X2 without inviting all the authorized members of the groups X1 and X2.

The invite message at steps 7 and step 9 contain the necessary identifiers for the PTT Clients to join the merged PTT call.

In some cases the invite message sent at step 7 may indicate that if the group is in an active group call, that the PTT controlling server X2 712 should invite the active members of group call X2. In other cases the invite message sent at step 7 does not indicate that PTT controlling server X2 712 should invite the active members of group call X2. In this case the invite messages at 9 is sent by the PTT controlling server X1 702 instead of the PTT controlling server X2 712.

At step 9, the PTT controlling server X2 712 broadcasts an invite message to all the active members in the group X2. The invite message may be a message that is configured to send over a multicast bearer. For example, the invite message may be a non-SIP message. In some cases, the invite message may include information of the active group call X1 that the members in the group X2 may join for the merged call. For example, the invite message may include an identifier of the group X1, e.g., the URI of the group X1. In some cases, the invite message may indicate the information of the bearer for the active group call X1. For example, the invite message may include one or more TMGIs for the active bearers used in the active group call X1. In some cases, the invite message may also include Proximity based Services (ProSe) information of the active group call X1. Alternatively or in combination, the invite message may be sent using a modified floor control message. The modified floor control message may include information about the new group call for the merged group call. For example, the invite message may include an identifier, a TMGI, or a combination thereof of the new group. In some cases, the invite message may include authentication information that may be used for authenticating the PTT clients in the group X2. For example, the authentication information may be an encrypted token, a P-Asserted URI, or a combination thereof.

At step 10, the PTT client B1 716 requests to join the active group call X1 for the merged call. In some cases, the PTT client B1 716 sends authentication response information to the PTT controlling server X1 702. The authentication response information may be associated with the authentication information in the broadcasted invite message. For example, the authentication response information may be based on the decrypted token. The PTT controlling server X1 702 may authenticate the PTT client B1 716 based on the authentication information and authorize the PTT client B1 716 to join the merged call. In some cases, the PTT controlling server X1 702 may authenticate the PTT client B1 716 using the authentication response information and the member list information received in step 8. Alternatively or in combination, the PTT client B1 716 may receive an authentication challenge. The authentication challenge may include a contact URI identity for the active group call X2. If the PTT client B1 716 does not successfully pass the authentication challenge the PTT controlling server X1 702 may determine that the group participation characteristics for the PTT Client are to be changed, e.g., instruct the PTT Client to leave the group call, instruct the PTT Client to not send data, or does not receive/is not sent data.

Similarly, at step 11, the PTT client B2 718 requests to join the active group call X1 for the merged call.

At step 12, the PTT client B1 716 sends an update message to the PTT participating server B 714, which forwards the update message to the PTT controlling server X2 712 at step 13. The update message may indicate that the PTT client B1 716 would not participate in the group call X2. For example, the update message may indicate that the PTT client B1 716 will not receive, will not send, or a combination thereof, in the group call X2. Similarly, at step 14, the PTT client B2 718 sends an update message to the PTT participating server B 714, which forwards the update message to the PTT controlling server X2 712 at step 15. In some cases, the PTT controlling server X2 712 may keep the group call X2 active until all the active members cease to participate in the group call X2. As discussed previously, in some cases, the PTT controlling server X2 712 may terminate the group call X2. Alternatively, the PTT controlling server X2 712 may put the group call X2 on hold.

Figure 8:
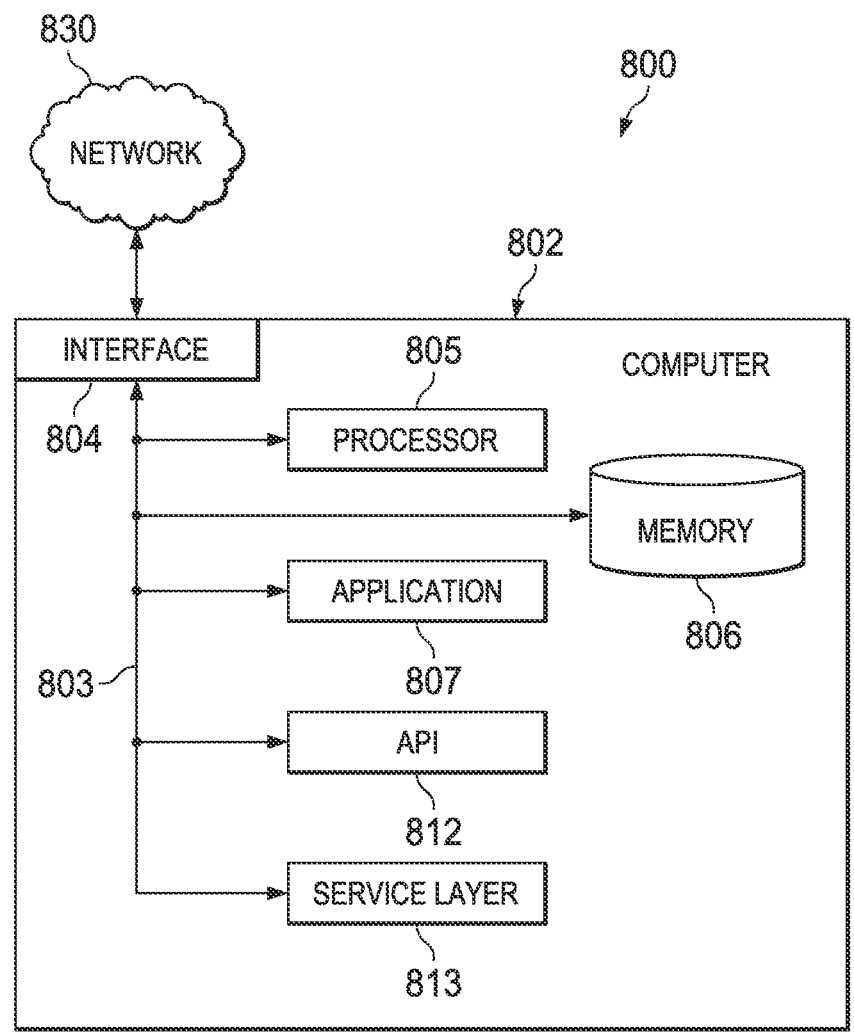
FIG. 8 is a block diagram of an exemplary computer that may be used to merge active group calls according to an implementation.

FIG. 8 is a block diagram 800 of an exemplary computer that may be used to merge active group calls according to an implementation. The illustrated computer 802 is intended to encompass any computing device such as a server, desktop computer, laptop/notebook computer, wireless data port, smart phone, personal data assistant (PDA), tablet computing device, one or more processors within these devices, and/or any other suitable processing device, including both physical and/or virtual instances of the computing device. Additionally, the computer 802 may comprise a computer that includes an input device, such as a keypad, keyboard, touch screen, microphone, speech recognition device, other device that can accept user information, and/or an output device that conveys information associated with the operation of the computer 802, including digital data, visual and/or audio information, or a GUI.

The computer 802 can serve as a client, network component, a server, a database or other persistency, and/or any other component of the system 100. For example, the computer 802 may be used to implement one or more functions of a PTT server or a PTT client. The illustrated computer 802 is communicably coupled with a network 830. In some implementations, one or more components of the computer 802 may be configured to operate within a cloud-computing-based environment.

At a high level, the computer 802 is an electronic computing device operable to receive, transmit, process, store, or manage data and information associated with the system 100. According to some implementations, the computer 802 may also include or be communicably coupled with an application server, e-mail server, web server, caching server, streaming data server, business intelligence (BI) server, and/or other server.

The computer 802 can receive requests over network 830 from a client application (e.g., executing on another computer 802) and respond to the received requests by processing the said requests in an appropriate software application. In addition, requests may also be sent to the computer 802 from internal users (e.g., from a command console or by another appropriate access method), external or third parties, other automated applications, as well as any other appropriate entities, individuals, systems, or computers.

Each of the components of the computer 802 can communicate using a system bus 803. In some implementations, any and/or all the components of the computer 802, both hardware and/or software, may interface with each other and/or the interface 804 over the system bus 803 using an application programming interface (API) 812 and/or a service layer 813. The API 812 may include specifications for routines, data structures, and object classes. The API 812 may be either computer language-independent or -dependent and refer to a complete interface, a single function, or even a set of APIs. The service layer 813 provides software services to the computer 802 and/or the system 100. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in Extensible Markup Language (XML) format or other suitable format. While illustrated as an integrated component of the computer 802, alternative implementations may illustrate the API 812 and/or the service layer 813 as stand-alone components in relation to other components of the computer 802 and/or system 100. Moreover, any or all parts of the API 812 and/or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802 and/or system 100. The interface 804 is used by the computer 802 for communicating with other systems in a distributed environment—including within the system 100—connected to the network 830 (whether illustrated or not). Generally, the interface 804 comprises logic encoded in software and/or hardware in a suitable combination and operable to communicate with the network 830. More specifically, the interface 804 may comprise software supporting one or more communication protocols associated with communications such that the network 830 or interface's hardware is operable to communicate physical signals within and outside of the illustrated system 100.

The computer 802 includes a processor 805. Although illustrated as a single processor 805 in FIG. 8, two or more processors may be used according to particular needs, desires, or particular implementations of the computer 802 and/or the system 100. Generally, the processor 805 executes instructions and manipulates data to perform the operations of the computer 802. Specifically, the processor 805 executes the functionality required for merging active group calls.

The computer 802 also includes a memory 806 that holds data for the computer 802 and/or other components of the system 100. Although illustrated as a single memory 806 in FIG. 8, two or more memories may be used according to particular needs, desires, or particular implementations of the computer 802 and/or the system 100. While memory 806 is illustrated as an integral component of the computer 802, in alternative implementations, memory 806 can be external to the computer 802 and/or the system 100.

The application 807 is an algorithmic software engine providing functionality according to particular needs, desires, or particular implementations of the computer 802 and/or the system 100, particularly with respect to functionality required for merging active group calls. For example, application 807 can serve as one or more components/applications described in FIGS. 1-12. Further, although illustrated as a single application 807, the application 807 may be implemented as multiple applications 807 on the computer 802. In addition, although illustrated as integral to the computer 802, in alternative implementations, the application 807 can be external to the computer 802 and/or the system 100.

There may be any number of computers 802 associated with, or external to, the system 100 and communicating over network 830. Further, the terms "client," "user," and other appropriate terminology may be used interchangeably as appropriate without departing from the scope of this disclosure. Moreover, this disclosure contemplates that many users may use one computer 802, or that one user may use multiple computers 802.

Figure 9:
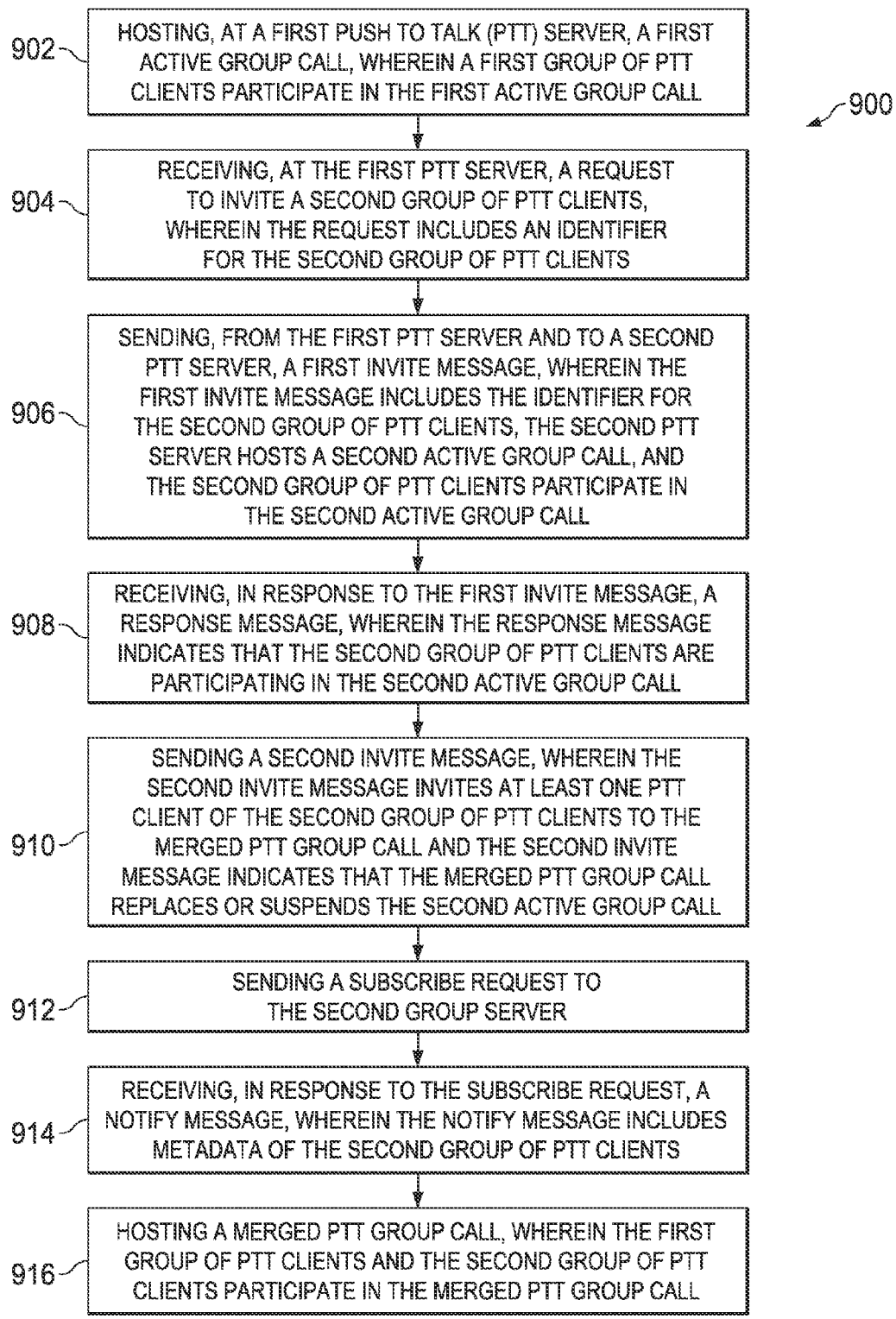
FIG. 9 is a flowchart illustrating an example method for merging active group calls.

FIG. 9 is a flowchart illustrating an example method 900 for merging active group calls. The method 900 may begin at block 902, where a first Push to talk (PTT) server hosts a first active group call. A first group of PTT clients participates in the first active group call. At block 904, the first PTT server receives a request to invite a second group of PTT clients. The request includes an identifier for the second group of PTT clients.

At block 906, the first PTT server sends a first invite message to a second PTT server. The second PTT server hosts a second active group call. The first invite message includes the identifier for the second group of PTT clients. The second group of PTT clients participates in the second active group call. At block 908, in response to the first invite message, the first PTT server receives a response message. The response message indicates that the second group of PTT clients is participating in the second active group call.

At block 910, the first PTT server sends a second invite message. The second invite message invites at least one PTT client of the second group of PTT clients to the merged PTT group call. The second invite message indicates that the merged PTT group call replaces or suspends the second active group call. In some cases, the second invite message is sent over a Multimedia Broadcast/Multicast Service (MBMS) channel.

At block 912, the first PTT server sends a subscribe request to the second PTT server. At block 914, in response to the subscribe request, the first PTT server receives a notify message. The notify message includes metadata of the second group of PTT clients. In some cases, the metadata indicates a pending request to send media. The pending request is received at the second PTT server prior to the first invite message. In some cases, the metadata indicates at least one of a timestamp, a queue position, or a priority of the pending request. In some cases, the metadata indicates a Multimedia Broadcast/Multicast Service (MBMS) bearer that is used by at least one PTT client of the second group of PTT clients for the second active group call. At block 916, the first PTT server hosts a merged PTT group call that is participated by the first group of PTT clients and the second group of PTT clients.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
    hosting, at a first Push to talk (PTT) server, a first active group call, wherein a first group of PTT clients participate in the first active group call;
    receiving, at the first PTT server, a request to invite a second group of PTT clients, wherein the request includes an identifier for the second group of PTT clients, the second group of PTT clients participate in a second active group call, and the second active group call is hosted by a second PTT server;
    sending, from the first PTT server and to the second PTT server, a first invite message, wherein the first invite message includes the identifier for the second group of PTT clients;
    receiving, in response to the first invite message, a response message, wherein the response message indicates that the second group of PTT clients are participating in the second active group call; and
    hosting a merged PTT group call, wherein the first group of PTT clients and the second group of PTT clients participate in the merged PTT group call.

2. The method of claim 1, further comprising sending a second invite message, wherein the second invite message invites at least one PTT client of the second group of PTT clients to the merged PTT group call and the second invite message indicates that the merged PTT group call replaces or suspends the second active group call.

3. The method of claim 2, wherein the second invite message is sent over a Multimedia Broadcast/Multicast Service (MBMS) channel.

4. The method of claim 1, further comprising:
    sending a subscribe request to the second PTT server; and receiving, in response to the subscribe request, a notify message, wherein the notify message includes metadata of the second group of PTT clients.

5. The method of claim 4, wherein the metadata indicates a pending request to send media, wherein the pending request is received at the second PTT server prior to the first invite message.

6. The method of claim 5, wherein the metadata indicates at least one of a timestamp, a queue position, or a priority of the pending request.

7. The method of claim 4, wherein the metadata indicates a Multimedia Broadcast/Multicast Service (MBMS) bearer that is used by at least one PTT client of the second group of PTT clients for the second active group call.

8. A device, comprising:
a memory; and
at least one hardware processor communicatively coupled with the memory and configured to:
host, at a first Push to talk (PTT) server, a first active group call, wherein a first group of PTT clients participate in the first active group call;
receive, at the first PTT server, a request to invite a second group of PTT clients, wherein the request includes an identifier for the second group of PTT clients, the second group of PTT clients participate in a second active group call, and the second active group call is hosted by a second PTT server;
send, from the first PTT server and to the second PTT server, a first invite message, wherein the first invite message includes the identifier for the second group of PTT clients;
receive, in response to the first invite message, a response message, wherein the response message indicates that the second group of PTT clients are participating in the second active group call; and
host a merged PTT group call, wherein the first group of PTT clients and the second group of PTT clients participate in the merged PTT group call.

9. The device of claim 8, wherein the at least one hardware processor is further configured to send a second invite message, wherein the second invite message invites at least one PTT client of the second group of PTT clients to the merged PTT group call and the second invite message indicates that the merged PTT group call replaces or suspends the second active group call.

10. The device of claim 9, wherein the second invite message is sent over a Multimedia Broadcast/Multicast Service (MBMS) channel.

11. The device of claim 8, wherein the at least one hardware processor is further configured to:
send a subscribe request to the second PTT server; and
receive, in response to the subscribe request, a notify message, wherein the notify message includes metadata of the second group of PTT clients.

12. The device of claim 11, wherein the metadata indicates a pending request to send media, wherein the pending request is received at the second PTT server prior to the first invite message.

13. The device of claim 12, wherein the metadata indicates at least one of a timestamp, a queue position, or a priority of the pending request.

14. The device of claim 11, wherein the metadata indicates a Multimedia Broadcast/Multicast Service (MBMS) bearer that is used by at least one PTT client of the second group of PTT clients for the second active group call.

15. A tangible, non-transitory computer-readable medium containing instructions which, when executed, cause a computing device to perform operations comprising:
hosting, at a first Push to talk (PTT) server, a first active group call, wherein a first group of PTT clients participate in the first active group call;
receiving, at the first PTT server, a request to invite a second group of PTT clients, wherein the request includes an identifier for the second group of PTT clients, the second group of PTT clients participate in a second active group call, and the second active group call is hosted by a second PTT server;
sending, from the first PTT server and to the second PTT server, a first invite message, wherein the first invite message includes the identifier for the second group of PTT clients;
receiving, in response to the first invite message, a response message, wherein the response message indicates that the second group of PTT clients are participating in the second active group call; and
hosting a merged PTT group call, wherein the first group of PTT clients and the second group of PTT clients participate in the merged PTT group call.

16. The tangible, non-transitory computer-readable medium of claim 15, wherein the operations further comprise sending a second invite message, wherein the second invite message invites at least one PTT client of the second group of PTT clients to the merged PTT group call and the second invite message indicates that the merged PTT group call replaces or suspends the second active group call.

17. The tangible, non-transitory computer-readable medium of claim 16, wherein the second invite message is sent over a Multimedia Broadcast/Multicast Service (MBMS) channel.

18. The tangible, non-transitory computer-readable medium of claim 15, wherein the operations further comprise:
sending a subscribe request to the second PTT server; and
receiving, in response to the subscribe request, a notify message, wherein the notify message includes metadata of the second group of PTT clients.

19. The tangible, non-transitory computer-readable medium of claim 18, wherein the metadata indicates a pending request to send media, wherein the pending request is received at the second PTT server prior to the first invite message.

20. The tangible, non-transitory computer-readable medium of claim 19, wherein the metadata indicates at least one of a timestamp, a queue position, or a priority of the pending request.

* * * * *